UNITED STATES PATENT OFFICE.

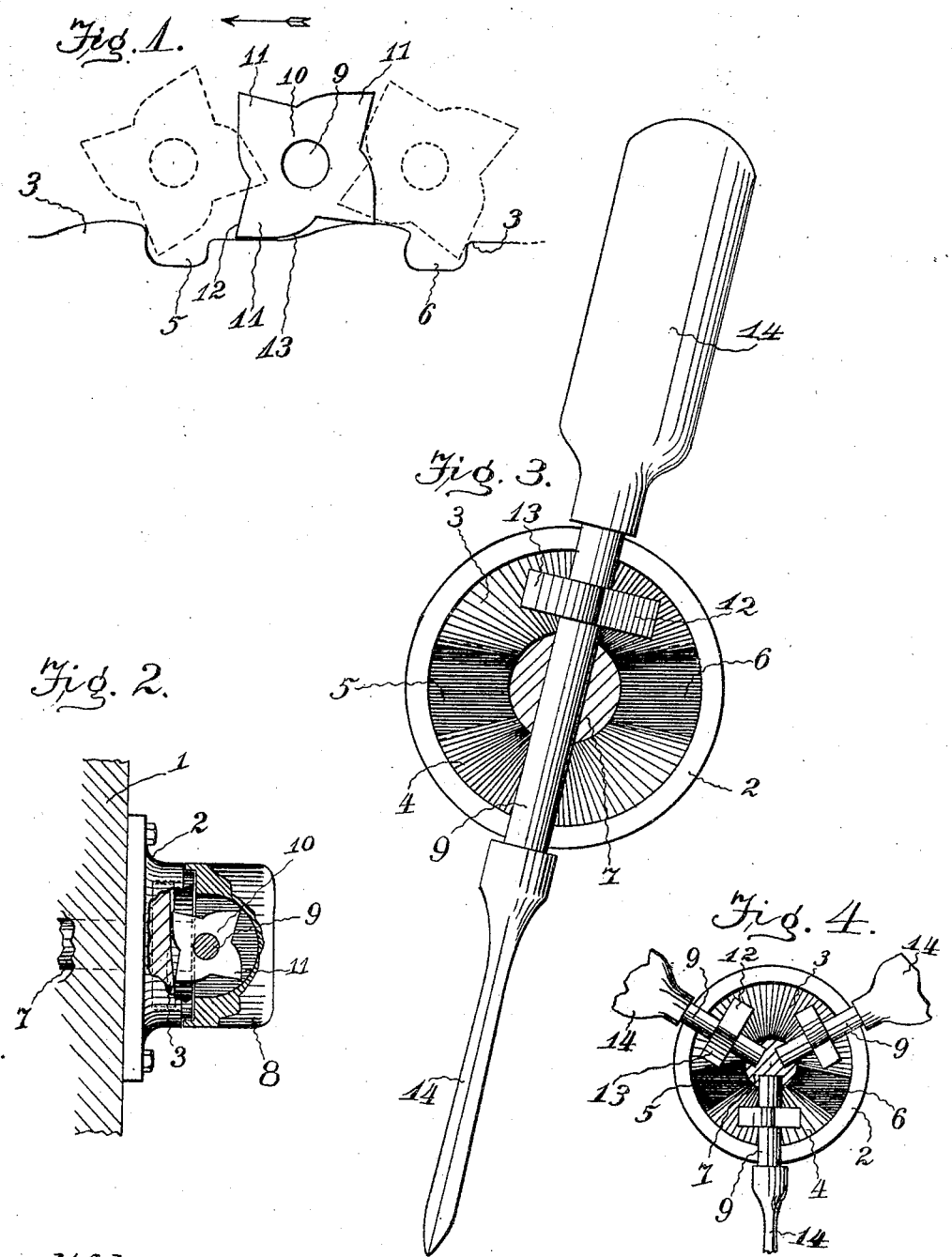

JAMES STEVENS HILLYER, OF SUPERIOR, WISCONSIN, ASSIGNOR TO RAPID TRANSIT & DEVELOPMENT COMPANY, A CORPORATION OF WISCONSIN.

GEARING FOR FEATHERING PADDLE-WHEELS.

No. 801,982. Specification of Letters Patent. Patented Oct. 17, 1905.

Application filed November 24, 1903. Serial No. 182,530.

*To all whom it may concern:*

Be it known that I, JAMES STEVENS HILLYER, a citizen of the United States, residing at Superior, in the county of Douglas and State of Wisconsin, have invented certain new and useful Improvements in Gearing for Feathering Paddle-Wheels; and I do hereby declare the following to be a full, clear, and exact description of the invention, such as will enable others skilled in the art to which it appertains to make and use the same.

My invention relates to mechanical movements, and has for its object the provision of means whereby a shaft projected at a right angle to a second shaft and carried thereby may be rotated or partly rotated on its own longitudinal axis during its rotation with its supporting-shaft.

With this and other objects in view it consists of certain constructions, combinations, and arrangements of parts as will be hereinafter described and claimed.

In the drawings, Figure 1 is a diagrammatic view of my said invention. Fig. 2 is a rear view, partly in section, of one form of my said invention. Fig. 3 is an end view of the same with the head or cover removed and the attaching portion of the base broken away; and Fig. 4 is a view corresponding approximately to Fig. 3, but of a modified form of my said invention.

My invention is applicable for use for a current wheel or motor or for a steamship paddle-wheel or for a variety of other services, and I do not, therefore, desire to be limited to one application of it; but for the purpose of showing its utility I will describe it as arranged for use as a steamship paddle-wheel.

In the drawings, 1 is a suitable supporting structure, in this case the side of a steamboat, to which is secured in any suitable manner a cam-disk 2, having cams 3 and 4 formed thereon and provided with suitable recesses 5 and 6 between said cams. Said disk has also formed therein a central aperture to receive the shaft 7, which is journaled in said disk and may be further supported in any suitable manner. Journaled in the outer end of said shaft or in a head 8, rigidly secured thereto, or in both said shaft and head, as desired, and extending at an angle to said shaft 7 is a shaft 9, which may extend at both ends outwardly of said shaft 7, as shown in Fig. 3, or may terminate at one end at or in said shaft 7, as shown in the modified form illustrated in Fig. 4. Keyed to said shaft 9 is a pinion 10, provided with teeth 11, each preferably having an approximately straight edge 12 and a longer convex edge 13, which teeth are respectively adapted at various times to bear against said cams and to slide thereon, so that while said shaft 9 is being continuously revolved upon or about the longitudinal axis of said shaft 7 the action of said cams upon said pinion causes said shaft 9 to make a series of partial revolutions at intervals upon its own longitudinal axis. Upon the outward end or ends of said shaft 9 are rigidly secured in any suitable manner paddle-blades 14, and in case more than one blade is thus mounted the blades are preferably so secured that when one has its broad face to the front the adjoining one will present its edge to the front. I do not, however, desire to limit myself to this arrangement, as the precise arrangement of the paddles depends somewhat on the number of paddles in use.

The shaft 7 may be rotated by any suitable engine in the boat connected by any suitable means or in any suitable manner to said shaft, such driving mechanism being well known to the art and not necessary to be herein particularly described. If the power, as that of a river-current, is first applied to the paddles, said shaft 7 may be coupled in any suitable manner or by any suitable means, well known to the art, to machinery to be driven by it.

In operation as the shaft 7 revolves it carries the shaft 9 around the axis of shaft 7. Assuming that at the time of starting the pinion 10 was in the position wherein it is shown in solid lines in Fig. 1, the rotation of said shaft 9 about the axis of shaft 7 carries said pinion forward in the direction of the arrow upon said figure until the lowest point on said pinion crosses the recess 5 and contacts with the higher end of the opposite cam 3, upon which it becomes slidably fulcrumed, whereupon said pinion begins a partial revolution, as shown in dotted lines near the left end of said Fig. 1, which movement continues and is communicated to said shaft 9 until said pinion and shaft 9 have accomplished a quarter-turn. If the movement of said shaft 7 is reversed, the action upon said pinion and shaft 9 is reversed, and in this case the partial rotation of said pinion is initiated by the convex edge of said tooth riding upon the highest point of the cam, thus causing the then preceding tooth to dip downward into the adjoining recess, as shown in dotted lines near the right of said Fig. 1, and to subsequently engage and become slidably fulcrumed upon the low end of the opposite cam.

Having now described my invention, what I claim, and desire to secure by Letters Patent, is—

In gearing for feathering paddle-wheels, the combination with a power-shaft, of a transversely-directed rotable driven shaft mounted thereon, a disk encircling said power-shaft and provided upon one face with annularly-alined stationary cams spaced by intervening recesses, a pinion keyed to said driven shaft and provided with teeth each having an approximately straight edge and a longer convex edge, said teeth being adapted to successively bear against cams and to dip into the recesses between said cams, substantially as described.

In testimony whereof I hereunto affix my signature in presence of two witnesses.

JAMES STEVENS HILLYER.

Witnesses:
O. T. KJARLANG,
CARROLL CORSON.